United States Patent [19]

Bozoyan

[11] 3,834,419
[45] Sept. 10, 1974

[54] DIGITAL COUNTERPOSING ACTUATORS

[76] Inventor: Edward Bozoyan, 1812 West St., Union City, N.J. 07087

[22] Filed: Aug. 28, 1972

[21] Appl. No.: 284,419

Related U.S. Application Data

[62] Division of Ser. No. 58,500, July 27, 1970, Pat. No. 3,686,970.

[52] U.S. Cl............................... 137/625.63, 92/37
[51] Int. Cl............................................ F16k 11/00
[58] Field of Search....... 137/625.63, 625.6, 625.64, 137/625.66; 92/34, 37 X

[56] References Cited
UNITED STATES PATENTS

| | | | |
|---|---|---|---|
| 1,416,210 | 5/1922 | Jung et al. | 92/37 X |
| 2,264,254 | 11/1941 | Brandt | 92/37 X |
| 2,340,008 | 1/1944 | Matuszak | 92/37 X |
| 2,879,781 | 3/1959 | Gimson | 92/37 X |
| 3,040,714 | 6/1962 | Taiclet | 92/37 X |
| 3,084,550 | 4/1963 | Bowditch | 92/37 X |

*Primary Examiner*—Henry T. Klinksiek
*Assistant Examiner*—Robert J. Miller

[57] ABSTRACT

A digital actuator comprising a combination of small lever arms in conjunction with a series of on/off torque motors constructed and arranged to reduce the stroke ratings of motors to binary-weighted displacements and add them up to one another; a hydraulically controlled modified sliding spool valve having a shift arm and positional bellows at each end; a control pressure bellows to receive the total of binary-weighted displacements and proportionally shift the spool by means of one of its shift arms via either positioner bellows.

12 Claims, 4 Drawing Figures

PATENTED SEP 10 1974 3,834,419
SHEET 1 OF 2

DIGITAL COUNTERPOSING ACTUATORS

The present application is a division of my application Ser. No. 058,500, filed July 27, 1970, which matured into U.S. Pat. No. 3,686,970 on Aug. 29, 1972.

SUMMARY OF THE INVENTION

This invention relates to proportional control systems and is particularly concerned with the provision of a new digital actuator capable of accepting digital command signals and mechanically converting them to analog linear movement. The invention is also concerned with a new spool driving concept utilizing the new actuator.

According to the present invention, there is provided a digital actuator including a series of on/off-type power units, such as torque motors, operated by digital signals, and a coacting lever network comprising small lever arms constructed and arranged to reduce the stroke ratings of the motors to discrete binary-weighted displacements which are automatically added to one another to form a total displacement precisely proportional to a digital input information.

There is further provided a modified four-way sliding master spool having (a) a shift arm mounted at each end driven proportionally by said total displacement, (b) a control pressure bellows developing hydraulic pressure and spurt according to the magnitude of the total displacement, (c) a mini directional valve, and (d) a pair of right and left positioner bellows.

At a digital input command, the hydraulic pressure and spurt are developed, and the directional valve acts to direct the spurt into one or the other of the positioner bellows, thus shifting the master spool to the right or the left. The modified master spool, paralleling the proportional displacement of the digital actuator, and as the actuator itself are both readily compatible with digital command sources.

STATE-OF-THE-ART AND OBJECTS

The increasing, widespread interest in digital actuators and digital control systems during the past decade has reached to a peak. Unfortunately, the high cost, the imperfect development, and the complexity of these devices have not permitted their general adoption. Digital servovalves and actuators developed up to this time have not met the prime requisites of basic simplicity and high reliability. The great variety of stepping mechanisms, as the natural digital actuators, do not exhibit a positive, promising avenue for the solution of the problem. The nozzle flapper hydraulic applifier, which has become the standard first stage of most electrohydraulic servovalves, is no longer practical here.

It is an important object of the present invention, therefore, to provide an accurate and inexpensive digital actuator having thousands of discrete positions without the use of intermediate, delicate, and complex electronic or electrical devices.

Another important object of the present invention is to provide a digital actuator utilizing mechanical digital-to-analog (D-A) conversion consisting of a simple combination of small lever arms and a decade of miniature-size electrical on/off power units, thus providing an inexpensive electromechanical actuator which is virtually insensitive to electrical hysteresis in its power portion and has in its conversion portion a simple and rigid as well as highly accurate mechanical structure that is insensitive to the entirety of variables (temperature, pressure, flow, contamination, noise, humidity, and all kinds of electrical forces and signals, as well as radiation and gravity). Rated actuating forces are amplified by the lever arms, and thus fluid components and circuitry can be dispensed with.

A further object of the present invention is to provide a new technique for driving the four-way sliding spool, utilizing a pair of counterposing and pressure-responsive drive elements which are contained in the spool housing and are activated by the displacements of the new digital actuator.

A digital technique well known in the art employs several cylinders in series, as an open-loop system, forming a multi-position device. This system is very simple and has very high potential accuracy. However, it is bulky since it requires a large number of cylinders to achieve fine resolution. Several inventions have been made, in this country and abroad, to reduce the physical bulk of this system. The present invention realizes the potential advantages of the multi-position system while reducing to a single and yet small pressure chamber the plurality of cylinders conventionally demanded by this type of system. It is therefore an additional object of the present invention to provide an open-loop system having but one small double-ended pressure chamber assembly for developing control power for either pilot or power operation; a series of on/off switching power units to depress at both ends of the pressure chamber; and coacting small lever network, reducing the stroke ratings of the power units to binary-weighted displacements and applying them to the end(s) of the pressure chamber as a precisely definite sum or total of displacements. Any desired amount of control power can be developed by the pressure chamber and applied directly into a load-actuator or used to control a spool displacement to achieve fluid amplification.

It is also within the contemplation of the present invention to provide a truly simple and inexpensive digital control system which is amenable to hazardous environments such as temperature extremes, and is highly accurate and reasonably lightweight, for general adoption in both military and commercial applications.

Other objects and many of the attendant advantages of this invention will be readily appreciated as the same become better understood by reference to the following detailed description when considered in connection with the accompanying drawings.

DESCRIPTION OF PREFERRED EMBODIMENTS

Figure 1:
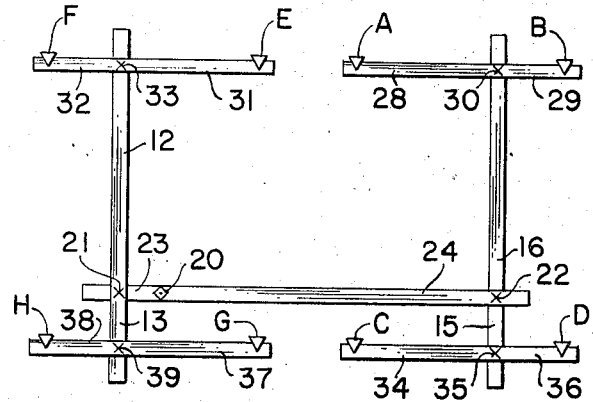
FIG. 1 is a top view of the lever arms showing how similar stroke ratings may be reduced to binary-weighted displacements and add up to one another.

Unlike prior inventions for converting digital input to analog output, the present invention employs a purely mechanical converting means. Although the principle of this mechanical converting means, the lever principle, is as old as civilization, its present application and the technique of utilization are entirely new. In the preferred form of the invention, the construction and arrangement of the combination of levers somewhat resemble the type face of an extended Karnak aitch(H) as illustrated in FIG. 1. In order to distinguish between the levers, these are named according to a functional simulation of the drafting implements attached to the horse-drawn carriage. In FIG. 1, the numerals 28–29, 31–32, 34–36, and 37–38 are singletree-type levers. Numerals 12–13 and 15–16 are doubletree-type levers, and 23–24 is the main summing lever member and the proportional driver. Singletree 31–32 rests freely on the upper end of the doubletree 12–13 at the point of support and transmission 33, and it is in engagement with two miniature power units (not shown) at receiving points E and F. As a typical example, point 33 is the transmission point on the transmission side of lever 31–32, and at the same time it is the receiving point on the receiving side of lever 12–13. As these two points meet each other in the drawing, only one reference number is given to both. The power units preferably may be small on/off torque motors, or suitable solenoids, or cam lobes, etc. The present invention does not relate to the actuating means; suffice it to say, for the purposes of this specification, that two small power units are employed to depress downwardly on the singletree 31– 32 (FIG. 2) at points E and F. This may be direct engagement or through the medium of linkage such as the U-shaped rod 42 (FIG. 2) mounted loosely on member 31–32 at the point of depression F. Theoretically, point 33 divides lever 31–32 into two unequal segments: the major segment 31 and the minor segment 32. The same kind of designation is used for all the levers in order to facilitate the understanding of their operation.

Number 40 (FIG. 2) designates a backing-plate serving operatively to support all the constituent members of the mechanism. A number of holes 41 are provided in plate 40 to receive the extended legs of rods 42. These rods 42 are permitted a slight forward and backward play, but not a sidewise movement. Hence, U-shaped connecting rods 42 act primarily as guides at each end of the singletree-type levers 28–29, 31–32, 34–36, and 37–38 by preventing the latter from tilting away from the axis of the former. Each rod 42 is provided with a follower 43 adjustably fastened on its legs by the screws 48 whereby it actuates one end of a foremost lever.

A small on/off type torque motor 17 (diagrammatically shown in FIG. 2) is provided for each end of the single-tree to engage with the follower 43 or directly with each of the points A, B, C, D, E, F, G, and H. Thus, any end, or any combination of singletree ends, or all of the ends together may be depressed downwardly at the full stroke rating of the motors 17. These stroke ratings are reduced to binary-weighted displacements, added to one another, and applied to a final common output point 20 on the main summing lever member 23–24, as described in detail in the following paragraphs.

Each of the singletree levers rests on its associate doubletree member at a transmission point located at ⅓ and/or ⅔ of its effective length (as 30, 35, 33, and 39 in FIG. 1). In other words, the length of the major segment 31 is exactly twice as long as segment 32; lever segment 28 is twice that of 29; 34 is twice that of 36; and 37 is twice that of 38. The arrangement is such that all the ends of the singletree levers are free to be depressed downwardly but are prevented from moving away or receding from the backing plate 40. This is accomplished by the U-shaped connecting rods 42 or other suitable means.

In the operation of this device, if, for example, a quartet of motors 17 having a uniform stroke rating of 1.35mm (millimeters), have been adopted in the right half of the device, the results are as follows: when end point A is depressed, lever 28–29 is swung about the now fulcral point B, and will transmit its depression to the reciving point 30 on the receiving side of the subsequent intermediary lever 15–16. This stroke, however, is decreased by a factor equal to the ratio of the entire length of lever 28–29 to the length of its minor segment 29, that is 3/1. Thus, a depression at receiving and end point A results in a depression of 1.35÷3=0.45mm at point 30. If instead of point A point B is depressed, lever 28–29 will swing about the now fulcral point A, and the resulting downard stroke at point 30 will be twice as great as it would be if point A were depressed, that is 1.35 + 3/2 = 0.90mm. If both receiving point A and point B are depressed, then the entire lever 28–29 is shifted down the full stroke, that is 1.35mm. It is of importance that the 1.35mm stroke is the sum of the results transmitted by point A and by point B; that is 1.35mm = 0.45 + 0.90.

Intermediary doubletree-type lever 15–16, in turn, transmits the depressions it receives to the main summing lever member 23–24 at point 22. Segment 15 represents 1/5 of the length of lever 15–16, and segment 16 represents 4/5 of its length. Accordingly, doubletree 15–16 reduces the depression strokes of lever 28–29 by a factor of 5 and that of lever 34–36 by a factor of 5/4. Thus, the stroke at point A constitutes a precisely definite displacement of 1.35 ÷ (3 × 5) = 0.09mm at point 22. Correspondingly, that at point B is a precisely definite displacement of 1.35 ÷ (3/2 × 5) = 0.18mm, and that at points A and B a precisely definite displacement of 1.35 ÷ 5 = 0.27mm. By the same token, that at point C, 1.35 ÷ (3 × 5/4) = 0.36mm; that at D, 1.35 ÷ (3/2 × 5/4) = 0.72 mm; that at C and D, 1.35 ÷ 5/4 = 1.08mm; and that at the whole quarter A, B, C, and D will be a displacement of exactly 1.35mm for point 22.

The output summing lever 23–24 executes a final reduction in terms of the aforesaid values. The ratio of segment 24 to segment 23 is 8/1. Thus, it transmits the strokes of the right quartet to its final output point 20 by scaling them down by a factor of 9. The stroke at point A is finally reduced to a precisely definite displacement or depression of 0.09 ÷ 9 = 0.01mm. This is a reduction by a factor of 135, that is the stroke of 1.35mm is divided by 135, and the discrete output stroke is 1.35 ÷ 135 = 0.01mm, which is the depression unit in this example. The stroke at B is scaled down to two binary-weighted units, 0.18 ÷ 9 = 0.02mm; that at C, to four binary units, 0.36 ÷ 9 = 0.04mm; and that at D, to eight depression units, 0.72 ÷ 9 = 0.08mm.

In the left half of the device (FIGS. 1 and 2) up to point 21, the stroke reduction scale is the same as that in the right half. A quartet of motors 17, having a linear stroke rating of 1.35mm, could also be used in the left half. However, in order to have the 8/1 ratio at the output lever 23-24, a quartet of motors 17 having a uniform stroke rating of 2.70mm has been adopted in the left half. Accordingly, the binary output result of each motor is as follows: that at point E is decreased by a factor of $3 \times 5 \times 9/8 = 135/8$, or 16 7/8 which gives the discrete output stroke of $2.70 \div 135/8 = 0.16$mm (16 depression units); that at point F is reduced by a factor of $3/2 \times 5 \times 9/8 = 135/16$, or 8 7/16, which gives the discrete output stroke of $2.70 \div 8\ 7/16 = 0.32$mm; that at point G is scaled down by a factor or $3 \times 5/4 \times 9/8 = 135/32$, or 4 7/32, which gives the quotient of $2.70 \div 135/32 = 0.64$mm; that at point H is decreased by a factor of $3/2 \times 5/4 \times 9/8 = 135/64$, or 2 7/64, which gives the quotient of $2.70 \div 135/64 = 1.28$mm, or 128 depression units, the maximum output stroke produced by an eigh-motor device.

Considered by itself, the above-described mechanism (FIG. 1 and the lever portion of FIG. 2) constitutes a single-stage actuator employing mechanical digital-to-analog (D-A) conversion. This digital actuator can accept digital input signals and convert them directly to an analog output without any intermediate processing. The digital signals may be generated by a command source, such as a tape reader, a computer, or any other means that may be developed for them. It is of importance to note that the conversion is done purely and solely by means of small levers. No electrical, hydraulic, or pneumatic elements are employed, and the device is thus substantially insensitive to temperature or any variable. As a result, there is no loss of motion, no impairment of accuracy whatsoever, during conversion. With its eight small power units the actuator can assume two hundred fifty six discrete output positions, which constitute 256 discrete output strokes. Optionally, or if necessary, the actuator may have a host of discrete positions, (up to the sixteenth power of two $2^{16}$), as will be described hereinafter.

Made full-scale, the above-described single-stage digital actuator may be used as an actuator and prime mover for driving and precisely positioning heavy loads directly. Inasmuch, however, as this prime mover/actuator has limited application (having the capability of proportionally positioning a load in one direction only — such — as lifting — while lacking the ability to stop the load or move it in the reverse direction), a pair of mover/actuators may be employed in a reciprocal arrangement, one for each direction.

This mover/actuator enjoys fundamental simplicity and high accuracy. It may be found welcome in very-high-temperature control systems inasmuch as it eliminates hydraulic amplification: firstly, it has several power units (eight on/off torque motors); secondly, actuation force-rates for its power units are amplified and summed through its lever network. When, for example, at point A the stroke of the motor is reduced by the factor of 135, its rated force is increased and amplified by substantially the same factor of 135. This means that only very small power units (motors) are required and the device will still deliver great power.

As a mover/actuator the present digital device would be better used in conjunction with two pressure-responsive positioners, a small directional valve, and a small accumulator. In this case, the load to be driven is controlled by one positioner at each end. The example given for this application is that of piloting a sliding spool (FIGS. 3 and 2), but it should be well understood that the present digital mover/actuator is capable of driving heavy loads purely by electrical power without the use of any pressurized fluid derived from a compressor.

Used as a pilot actuator for power valves, the present actuator could take any possible miniaturization, owing to its inherent power and to the small amount of control fluid that it has to displace. An example of piloting a four-way sliding spool and a new technique for driving the spool is given hereinafter.

Figure 2:
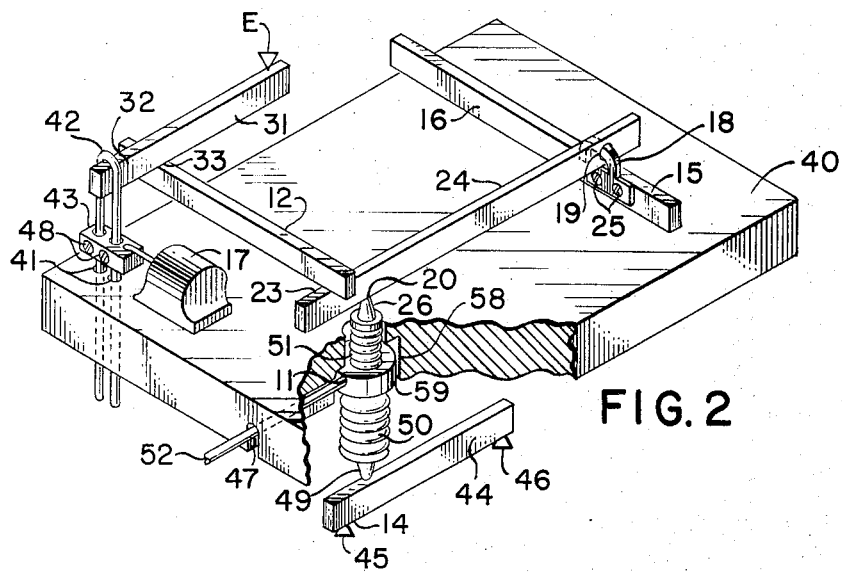
FIG. 2 is an isometric view of the primary or control stage of the present invention, some of the lever arms and other repeated parts being omitted for clarity.
Figure 4:
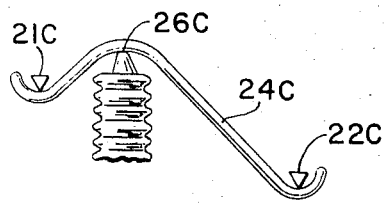
FIG. 4 is an isometric view of a modified lever arm which could replace the straight lever arm.

In FIGS. 1 and 2, the coacting levers are shown arranged in right angle planes with respect to one another; however, they can be arranged in planes of other given angles and yet produce the same results. To obtain a physically compact structure and a low center of gravity, some of the levers may be freely underslung from the others. An example of that kind of suspension doubletree lever 15–16 (FIG. 2), can be secured on lever 23–24 precisely at point 22 by a hook 18 engaged in a hole 19, hook 18 being fastened to minor segment 15 of lever 15–16 by screws 25.

Member 50–51 (FIG. 2) is a control pressure bellows assembly formed by a small diameter bellows 51 united, as by welding, to a larger diameter bellows 50, and it has a service port 11. Bellows assembly 50–51 is disposed transversely in a recessed hole 58 bored into the race of backing plate 40; being inserted from the underside, it rests on recess 59, passes through hole 58, and is secured to plate 40 by means not shown. The bellows is preferable terminated in dome-like caps 26 and 49 at its respective ends. A common hydraulic deliver line 52, extending through bore 47 in plate 40, is connected to service port 11 of bellows 50–51 and communicates with the united interiors of 51 and 50. Numerals 14–44 designate the lower output summing lever, with 45 and 46 fulcral receiving points. Lever 14–44 performs a function in the lower level of FIG. 2 similar to that of lever 23–24 in the upper level. If it is desired to obtain very numerous discrete output positions, for example, the sixteenth power of two ($2^{16} = 65,535$), then the level underneath plate 40 must be equipped similar to the upper level; that, along with lever 14–44, two doubletree-type intermediary levers, four singletree-type foremost levers, and eight torque motors are required. The description and operation of this arrangement are similar to those of the upper level. If it is desired to obtain the twelfth power of two ($2^{12} = 4,096$) discrete output positions, then lever 14–44 must be considered as a doubletree lever, thus establishing a segments ratio of four to one. In this case, two singletree levers and four torque motors must be employed with it. On the other hand, if it is desired to obtain the tenth power of two ($2^{10} = 1,024$) discrete output positions, then lever 14–44 must be a singletree-type lever with only two torque motors employed with it, yielding a segments ratio of two-to-one.

Figure 3:
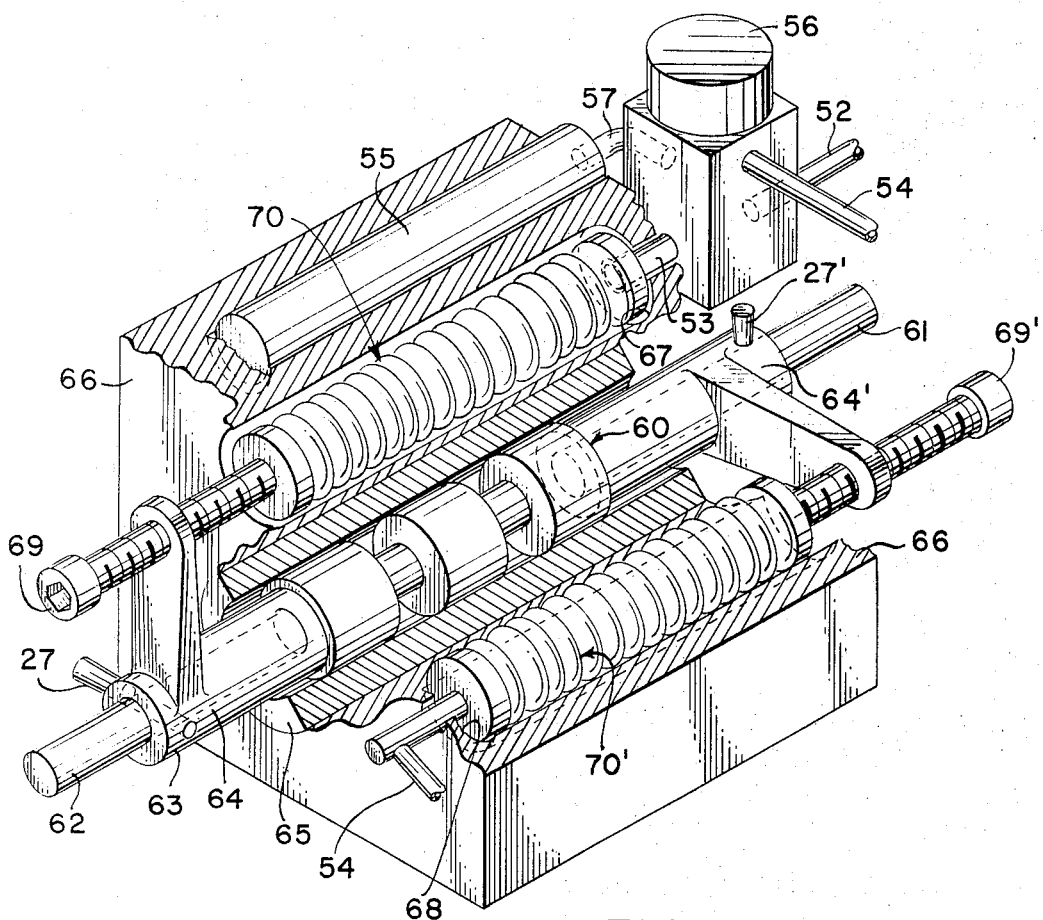
FIG. 3 is a cutaway view, partly in section, of a proportional control valve showing an improved four-way sliding spool in conjunction with one of the new shift arms mounted on its left end, one of the positioner bellows, and the drive accessories.

Referring now to FIG. 3, item 60 is an improved movable valve member, i.e., a four-way sliding spool having a right-hand shank as a drive end 61 and a left-hand shank as a drive end 62. Left shift arm 63 is mounted on spool shank 62, being first slidably positioned on shank 62 and then locked in fixed place by pin 27. Radial shift arm 63 thus operates as an integral part of spool 60. Screw 69 is adjustably thread-mounted on 63. A like shift arm 63' is similarly mounted on right shank 61. Sleeve member 65 is shorter in length than conventional sleeves because there is no need for spool end chambers in the present design. Item 66 is a portion of a valve housing enveloping the sleeve; this housing has right and left side wall portions 67 and 68, respectively.

Resting against wall 67 and extending axially parallel to and side by side with the spool is upper adjacent positioner bellows 70. A similar lower adjacent positioner bellows 70' rests against wall 68 and also extends parallel and coplanar to the spool. A miniature four-way, directional underlapped electro-hydraulic valve 56 (diagrammatically shown) serves to establish and cut off hydraulic communication between pressure bellows 50–51, upper and lower positioner bellows 70, a miniature hydraulic accumulator 55, and associated hydraulic lines: of which line 52 connects member 50–51 with valve 56, line 53 connects 56 to upper 70, line 54 connects 56 to lower 70', and line 57 connects 56 to 55. Pressure bellows 50–51, upper and lower positioner bellows 70, the hydraulic chamber of valve 56, and accumulator 55, as well as connecting lines 52, 53, 54, and 57, are filled with an incompressible fluid and properly bled as in the practice of hydraulic actuation systems. Thus, a solid column of fluid stands in each of these members. Screws 69 are turned until each engages the base of bellows 70 and are then tightened an additional turn to provide a preload pressure in the hydraulic system. This preload pressure (1) provides firmer contact at both sides of the sliding spool 60; (2) compensates contraction and expansion due to temperature changes; and (3) assists the bellows in re-expanding quickly and regaining the "at rest" position after being compressed by lever 23–24 and/or lever 14–44.

DESCRIPTION OF OPERATION

In operation, the digital actuator is controlled by the digital outputs obtained from the command source (computer or tape reader, etc.) interface circuits. Control signals will actuate valve 56 for right or left position, and a separate data line will connect to each of the torque motors, each representing one bit in the word format.

A typical command will first actuate valve 56 to its right or left position. The other output signals will energize one or more torque motors in the unique combination required to achieve the individual binary-weighted displacements whose collective movement will position spool 60, the desired distance in the desired direction.

Suppose, for example, it is desired to move spool 60 to the left. An input signal from the interface unit energizes valve 56 to its first (left) energized position, which thereupon connects upper positioner bellows 70 with control pressure bellows 50–51 and lower bellows 70' with accumulator 55, respectively. Now lower bellows 70' is stopped from accepting any fluid. The binary coded electrical input from the command source interface circuits energizes the command-source-selected torque motors, thus producing discrete lever output strokes. These are summed by upper lever 23–24 and/or lower lever 14–44, thereby depressing and developing in member 50–51 a hydraulic pressure in direct proportion to the binary coded signal. This developed control pressure forces a hydraulic spurt of corresponding magnitude through serviceport 11, and through line 52 into upper positioner bellows 70, causing it to expand against screw 69 and shift arm 63, thereby shifting power spool 60 proportionately along its linear travel axis towards the left. In shifting toward the left, spool 60 depresses lower bellows 70', which in turn discharges its fluid into accumulator 55 now connected to it.

The shifting of spool 60 in proportion to the aggregate of lever stroke displacements dictated by the command source, allows power fluid to pass to a load actuator. The power fluid is derived from a supply source in the conventional manner. The period of time in which this entire operation is carried out is predetermined by the hydraulic capacity, the internal parameters of the digital actuator, and in the outputs from command source interface circuits. At the end of the period, the load has assumed its commanded position and all torque motors and valve 56 are de-energized, with all members back in their respective "at rest" positions. The hydraulic fluid displaced by the depression of bellows 50–51 also rushes back to its "at rest" position. Within the few milliseconds required by valve 56 to return to its null position (and even beyond that) upper positioner bellows 70 forces it additionally held fluid back into control pressure bellows 50–51 by means of its spring property and with the aid of coacting members: lower positioner 70' and accumulator 55, which tend to return to their "at rest" positions since the pressure exerted against them has been removed. Thus, during this same period of time, accumulator 55 returns the fluid it has received to lower positioner bellows 70 via valve 56. In its null position, valve 56 permits the communication of all the members connected to it by means of its underlapped by-pass feature.

The over-all response time of the digital actuator is estimated to be a few decades of milliseconds.

If spool 60 is to be moved in alternate cycle and in opposite direction: toward the right, on command from the command source, valve 56 assumes its second energized position (right), thereby connecting lowering positioner bellows 70' with control pressure bellows 50–51 and the upper positioner bellows 70 with accumulator 55, respectively. Now upper bellows 70 is stopped from accepting any fluid. As commanded hydraulic pressure and spurt are developing, lower bellows 70' expands in opposite direction and upper bellows 70 contracts. As the torque motors and associated levers operate in the same manner for both left and right commands to valve 56, they now cause a shift of spool 60 to the right.

In its null position, spool 60 is precisely centralized and held clamped by two screws 69. Should some spurious pressure develop in either positioner bellows, this will be instantly transmitted to the other positioner and into the entire pilot hydraulic system through valve 56. Here all pressures are neutralized by the counterposing of upper and lower positioners 70 and the by-pass feature of valve 56. Thus, spool 60 will not move until valve 56 is energized.

In a 10-motor actuator, lever 14–44 will be a single-tree-type and the ratio of its segments 44 and 14 will be two-to-one. As a consecutive binary power unit following unit H, the motor depressing at point 46 must produce a fluid displacement twice as great as the spurt generated by the depression at point H. If in the control pressure bellows the diameter of the larger portion 50 it twice that of the small portion 51, then an equal depression at 49 will produce a spurt four times as great as at 20 and 26. Thus, to produce the desired spurt volume displacement $1.28 \times 2/4 \times 3 = 0.64 \times 3 = 1.92$ mm. Thus, point 46 of segment 44 must be depressed 1.92mm. Therefore, the motor strokes at points 45 and 46 must each be 1.92mm.

The 10-motor digital actuator can assume 1,024 − 1 = 1,023 active discrete positions (one position being the "at rest" position) with the same number (1,023) of depression units. Under normal conditions, with all 1,023 depression units applied, spool 60 will execute its maximum (or full) stroke towards the right or left and the load will be driven to its full travel in a determined response time. For example, if the full stroke of spool 60 to one side is a half inch, the movement due to one depression unit is 0.5 ÷ 1,023 = 0.000488 inch. To move the spool and the load half the total travel, the motor at 45 only is energized, whereby 512 units are applied (which is substantially half of 1,023). If only one third of the full span is required, then 341 depression units must be applied. The motors to be energized are selected by the command source as follows: the first selected is always the one yielding the highest output under the required total quantity, which in this case is the motor at 46, whose output stroke is 1.92 × ⅓ × 4 = 256 units. This leaves a first remainder of 85 units; then, the highest for the 85 total is that at G (64) leaving a second remainder of 85 − 64 = 21; then the motor at E(16), leaving a third remainder 21 − 16 = 5; then the motor at C(4), and finally the motor at A (1). Summarizing, motors 46, G, E, and A are energized, their respective contributions adding up to the sum of 341 units, which is ⅓ of the full span of the device.

After the load and the load actuator are moved correspondingly, they remain at their last position while the motors and valve 56 are de-energized and with spool 60 return to their "at rest" positions.

It is important to note that the conversion of the digital command from the command source to a corresponding analog movement is performed with high precision by means of the lever arms exclusively. Adjustable followers 43 serve to take up any slack between the several levers and up to the final depression point 20 or 49. There is no backlash or lost motion such as is found in certain stepping mechanisms. The arrangement is insensitive to, and hence unaffected by, any variable, including temperature, pressure, contamination, etc. The process of summing the binary values is undeviatingly correct and the result mathematically exact.

It is also important to note that said provided high precision analog movement is instantly and directly executed with equal accuracy. The power spool 60 is at all times actually clamped (as stated above) between the two positioner bellows which drive it by two solid hydraulic columns. Thus spool 60 is prevented from overshooting and/or undershooting. In addition, the aforesaid preloading feature of the positioner bellows and the underlap of valve 56 in conjunction with the precision analog movement, will cause the spool 60 to find the exact position in one-shot operation regardless of frictional resistance or any other variable, no hunting being involved.

What is claimed is:

1. A fluid-mechanical control device in operative connection with control pressure means and adapted to position an adjacent load member having two integral drive ends, a travel axis and a central at-rest position, comprising:

a pair of identical, separate and coacting positioners, disposed side by side with and in actuating engagement with said two integral load member drive ends, each of said positioners having a fluid-filled interior and therefore being pressure-responsive, a fluid line communicating with each of said interiors and with said control pressure means, each of said positioners being coplanar with said load member, and assuming linear expansion and contraction movements and thus having a plurality of discrete positions proportional to the quantity of control pressure fluid accepted in its interior, said quantity of fluid being operatively regulated by said control pressure means, each positioner having a linear output and radial arm means for transmitting said linear output unaltered to said load member without any change in magnitude and direction, each positioner being adapted to expand alone, in alternate cycle and in opposite direction with respect to the other positioner, each positioner, when expanding, moving said load member in said opposite direction, singly and independently, without force or feedback from the other positioner, one positioner at a time being stopped from accepting any fluid while the other positioner is operatively expanding by accepting pressure fluid.

2. A fluid-mechanical control device in operative connection with control pressure means and adapted to position an adjacent load member having two opposite drive ends, comrpising:

a pair of identical, separate and coacting, right and left positioner members in actuating engagement with said drive ends, each of said positioners having a linear unaltered output, and a fluid-filled interior and thus being pressure-responsive, a fluid line communicating with each of said interiors and with said control pressure means, a directional valve means accepting said fluid lines of both positioner members and having further fluid connection with said control pressure means, said valve member connecting the right positioner with said pressure means in one operative cycle, connecting the left positioner in another cycle, and neither one in its null position.

3. The control mechanism of claim 2 further comprising, an accumulator means in communication with said directional valve, said valve connecting one positioner with the control pressure means, while connecting the other positioner with said accumulator means, and in its null position by-passing fluid between all the members.

4. In a fluid-mechanical control system, the combination according to claim 3, which further comprises, proportional control pressure means including a liquid-filled hydraulic chamber and mechanical driver means, said hydraulic chamber having a depressible end in operative engagement with said mechanical driver means, and a service port providing passage for said fluid connection of said directional valve member, said hydraulic chamber initiating hydraulic pressure and forcing out a correspondingly proportional discrete hydraulic spurt when receiving a given linear depression from said mechanical driver.

5. The device of claim 4, wherein said hydraulic chamber has a stepped diameter and consists of an expansion bellows.

6. The combination of claim 5 wherein said proportional driver means comprises, a coacting lever network means having a plurality of receiving points and a final linear output point in operative engagement with said depressible end of said hydraulic chamber, means for operatively supporting said lever network and said hydraulic chamber, the receiving points of said levers being in supporting and actuating engagement with on/off-type stationary power unit means having linear stroke ratings, said stroke ratings being scaled down, through said coacting lever network, to discrete binary values and summed together at said final output point.

7. The device of claim 6, wherein said lever network means comprises, two groups of levers each having its own output lever, the hydraulic chamber having two depressible ends, the output lever of one group being in operative engagement with one depressible end, and the output lever of the other group being in operative engagement with the other depressible end.

8. The device of claim 1, wherein said counterposing and coacting two positioners consist of expansion bellows.

9. The control mechanism of claim 3, wherein each of said positioners is adapted to engage said load member by means of a radial shift arm, and means for adjusting the relative position of each positioner member and the load member.

10. The control device of claim 1, wherein said radial arm means comprises:

a fixed shift arm directly and precisely transmitting said linear expansion movement of one positioner to said load member in one operative cycle, without any change in magnitude and direction, whereby any movement transmitted to said load member is equal to said one positioner expansion, another fixed shift arm directly and precisely transmitting such said load movement to the other positioner in said same operative cycle, without any change in magnitude and direction, said transmitted load movement thereby causing the contraction to said other positioner, whereby such positioner contraction is equal to said movement of the load member, said two fixed shift arm members being radial to said load travel axis, as well as to said two positioners, said load member and said radial shift arm members constituting an operative physical connection between said positioners.

11. The device of claim 1, wherein said control pressure means further comprises valving means for stopping said one contracting positioner from accepting any fluid while the other positioner member is operatively expanding by accepting pressure fluid and moving said load member, both of said positioners assuming their half-expanded position and coactively returning the load member to its said central position when both of said positioners are stopped from accepting any fluid.

12. The device of claim 1, wherein said two positioner members coactively have four linear full strokes at both sides of said central at-rest position, the first full stroke being the linear movement towards the right and extending from said central position to the full right position, the second stroke being towards the left, from said full right, to the central, the third stroke being towards the left, from the central, to the full left, the fourth stroke being towards the right, from the full left, to the central, said two positioner members also having a host of partial strokes shorter than one full stroke, for intermediary positions at right and at left.

* * * * *